(12) United States Patent
Xiao et al.

(10) Patent No.: US 9,733,774 B2
(45) Date of Patent: Aug. 15, 2017

(54) TOUCH-SENSITIVE DEVICE AND MANUFACTURING METHOD THEREOF

(71) Applicant: TPK Mastouch solutions (xiamen) Inc., Xiamen (CN)

(72) Inventors: Tiefei Xiao, Hengyang (CN); Zhengqiang Sun, Tianjin (CN); Li Luo, Ji'an (CN); Yongshan Chen, Quanzhou (CN)

(73) Assignee: TPK Mastouch solutions (xiamen) Inc., Xiamen (CN)

( * ) Notice: Subject to any disclaimer, the term of this patent is extended or adjusted under 35 U.S.C. 154(b) by 33 days.

(21) Appl. No.: 14/723,465

(22) Filed: May 28, 2015

(65) Prior Publication Data

US 2015/0346880 A1 Dec. 3, 2015

(30) Foreign Application Priority Data

May 30, 2014 (CN) .......................... 2014 1 0245933

(51) Int. Cl.
*G06F 3/044* (2006.01)

(52) U.S. Cl.
CPC .... *G06F 3/044* (2013.01); *G06F 2203/04103* (2013.01)

(58) Field of Classification Search
CPC ........................................... G06F 3/041–3/044
See application file for complete search history.

(56) References Cited

U.S. PATENT DOCUMENTS

| | | | | |
|---|---|---|---|---|
| 5,568,291 | A * | 10/1996 | Murata | G02F 1/133512 349/110 |
| 5,761,361 | A * | 6/1998 | Pfandl | G02B 6/04 385/100 |
| 6,319,557 | B1 * | 11/2001 | Ikushima | C08G 59/24 427/385.5 |
| 8,994,668 | B2 * | 3/2015 | Yoshiyama | G06F 3/041 345/173 |
| 9,081,462 | B2 * | 7/2015 | Xie | G06F 3/044 |
| 9,262,022 | B2 * | 2/2016 | Lee | G06F 3/044 |
| 2009/0160817 | A1 * | 6/2009 | Wu | G06F 3/044 345/173 |
| 2009/0166431 | A1 * | 7/2009 | Aoyama | G06K 19/07749 235/492 |
| 2010/0164881 | A1 * | 7/2010 | Kuo | G06F 3/044 345/173 |
| 2011/0056623 | A1 * | 3/2011 | Im | C09J 5/06 156/275.5 |

(Continued)

FOREIGN PATENT DOCUMENTS

TW M499647 5/2014

Primary Examiner — Patrick F Marinelli
(74) Attorney, Agent, or Firm — Paul Bendemire

(57) ABSTRACT

A touch-sensitive device includes a cover plate, a first electrode layer and a laminated electrode structure. The cover plate has opposite upper and lower surfaces. The first electrode layer is disposed on the lower surface of the cover plate. The laminated electrode structure includes an adhesive substrate and a second electrode layer. The adhesive substrate is electrically insulating and heat-activated adhesive. The second electrode layer is disposed on a surface of the adhesive substrate, where another surface of the adhesive substrate that is opposite to the surface on which the second electrode layer is disposed is laminated to the first electrode layer.

8 Claims, 8 Drawing Sheets

(56) References Cited

U.S. PATENT DOCUMENTS

| | | | |
|---|---|---|---|
| 2011/0099805 A1 | 5/2011 | Lee | |
| 2011/0200064 A1* | 8/2011 | Banno | H01S 5/0216 |
| | | | 372/44.01 |
| 2011/0227847 A1* | 9/2011 | Yoshiyama | G06F 3/041 |
| | | | 345/173 |
| 2011/0279405 A1* | 11/2011 | Meng | G06F 3/044 |
| | | | 345/174 |
| 2012/0026107 A1* | 2/2012 | Kim | G06F 3/044 |
| | | | 345/173 |
| 2012/0038594 A1* | 2/2012 | Kim | G06F 3/044 |
| | | | 345/176 |
| 2012/0113361 A1* | 5/2012 | Huang | G06F 3/041 |
| | | | 349/96 |
| 2012/0235928 A1* | 9/2012 | Chang | H01L 27/323 |
| | | | 345/173 |
| 2012/0298497 A1 | 11/2012 | Maeda et al. | |
| 2013/0043068 A1* | 2/2013 | Xie | G06F 3/044 |
| | | | 174/262 |
| 2013/0043116 A1* | 2/2013 | Shih | G06F 3/044 |
| | | | 200/600 |
| 2013/0092520 A1* | 4/2013 | Lee | G06F 3/044 |
| | | | 200/600 |
| 2013/0164479 A1 | 6/2013 | Lo et al. | |
| 2013/0285938 A1 | 10/2013 | Kang et al. | |
| 2013/0314347 A1* | 11/2013 | Muraoka | H01H 9/02 |
| | | | 345/173 |
| 2014/0062908 A1 | 3/2014 | Ra | |
| 2014/0092322 A1 | 4/2014 | Lee et al. | |
| 2014/0176826 A1* | 6/2014 | Kim | G06F 3/0416 |
| | | | 349/12 |
| 2014/0232957 A1* | 8/2014 | Lee | G06F 3/044 |
| | | | 349/12 |
| 2014/0346317 A1* | 11/2014 | Cho | G01J 1/42 |
| | | | 250/200 |
| 2015/0097175 A1* | 4/2015 | Liu | H01L 27/323 |
| | | | 257/40 |
| 2015/0153864 A1* | 6/2015 | Yoshiyama | G06F 3/041 |
| | | | 345/173 |
| 2015/0220183 A1* | 8/2015 | Youngs | G06F 3/044 |
| | | | 345/173 |
| 2015/0338959 A1* | 11/2015 | Xie | G06F 3/044 |
| | | | 345/174 |
| 2015/0346880 A1* | 12/2015 | Xiao | G06F 3/047 |
| | | | 345/173 |
| 2016/0124546 A1* | 5/2016 | Chen | G06F 3/044 |
| | | | 345/174 |
| 2016/0132157 A1* | 5/2016 | Lee | G06F 3/044 |
| | | | 345/174 |

* cited by examiner

TOUCH-SENSITIVE DEVICE AND MANUFACTURING METHOD THEREOF

BACKGROUND OF THE INVENTION

This application claims priority of Chinese Patent Application No. 201410245933.7, filed on May 30, 2014.

FIELD OF THE INVENTION

The disclosure relates to touch-sensitive devices, and more particularly to touch-sensitive devices that are thin, light-weight and easy-to-produce, and methods of manufacturing the touch-sensitive devices.

DESCRIPTION OF RELATED ART

Touch-sensitive devices are widely used in display panels of various electronic devices. Touch-sensitive electrodes of the touch-sensitive device are usually made of a light-transmissible material for sensing a touch location of a user. In manufacturing a conventional touch-sensitive device, indium tin oxide (ITO) is sputtered onto a cover plate (e.g., a glass substrate) to form a first conductive layer, then an insulation layer is formed on the first conductive layer, and finally another layer of indium tin oxide is sputtered onto the insulation layer to form a second conductive layer. A touch electrode structure is therefore formed on the same side of the cover plate. However, sputtering of the indium tin oxide is conducted at an elevated temperature. When depositing the indium tin oxide on the insulation layer, chemicals of the insulation layer tend to evaporate due to the elevated temperature and affect purity of the second conductive layer. As a result, electric conductivity of the conductive layers and production yield of the touch electrode structure can be adversely affected.

In order to avoid the aforementioned adverse effect by the elevated temperature, arrangements of the first and second conductive layers may be changed to allow the insulation layer to be omitted. For example, the first conductive layer can still be formed on the cover plate, while the second conductive layer is formed on a separate carrying substrate. Then, the cover plate and the carrying substrate are adhered together for the first and second conductive layers to be able to work together, so that the touch electrode structure is formed. However, in such a manner, an additional substrate is added. The additional substrate increases the overall thickness of the touch electrode structure and adversely affects the development of a thinner and more light-weight touch-sensitive device.

SUMMARY OF THE INVENTION

Therefore, an object of the disclosure is to provide a touch-sensitive device that is thin and light-weight, and that can avoid adverse effects attributed to high temperature processing. Another object of the disclosure is to provide a method of manufacturing the touch-sensitive device.

According to one aspect of the present disclosure, a touch-sensitive device includes a cover plate, a first electrode layer and a laminated electrode structure. The cover plate has opposite upper and lower surfaces. The first electrode layer is disposed on the lower surface of the cover plate for generating a first touch sensing signal. The laminated electrode structure includes an adhesive substrate and a second electrode layer. The adhesive substrate is electrically insulating and heat-activated adhesive. The second electrode layer is disposed on a surface of the adhesive substrate. Another surface of the adhesive substrate that is opposite to the surface on which the second electrode layer is disposed is laminated to the first electrode layer.

According to another aspect of the present disclosure, a method of manufacturing the touch-sensitive device includes the following steps:

(A) providing a light-transmissible cover plate and a laminated electrode structure, the cover plate having opposite upper and lower surfaces, the laminated electrode structure including an adhesive substrate that is electrically insulating and heat-activated adhesive, and a second electrode layer that is formed on a surface of the adhesive substrate;

(B) forming, a first electrode layer on the lower surface of the cover plate; and (C) laminating another surface of the adhesive substrate that is opposite to the surface on which the second electrode layer is disposed to the first electrode layer.

BRIEF DESCRIPTION OF THE DRAWINGS

Other features and advantages of the present disclosure will become apparent in the following detailed description of the embodiments with reference to the accompanying drawings, of which.

DETAILED DESCRIPTION OF THE INVENTION

Figure 1:
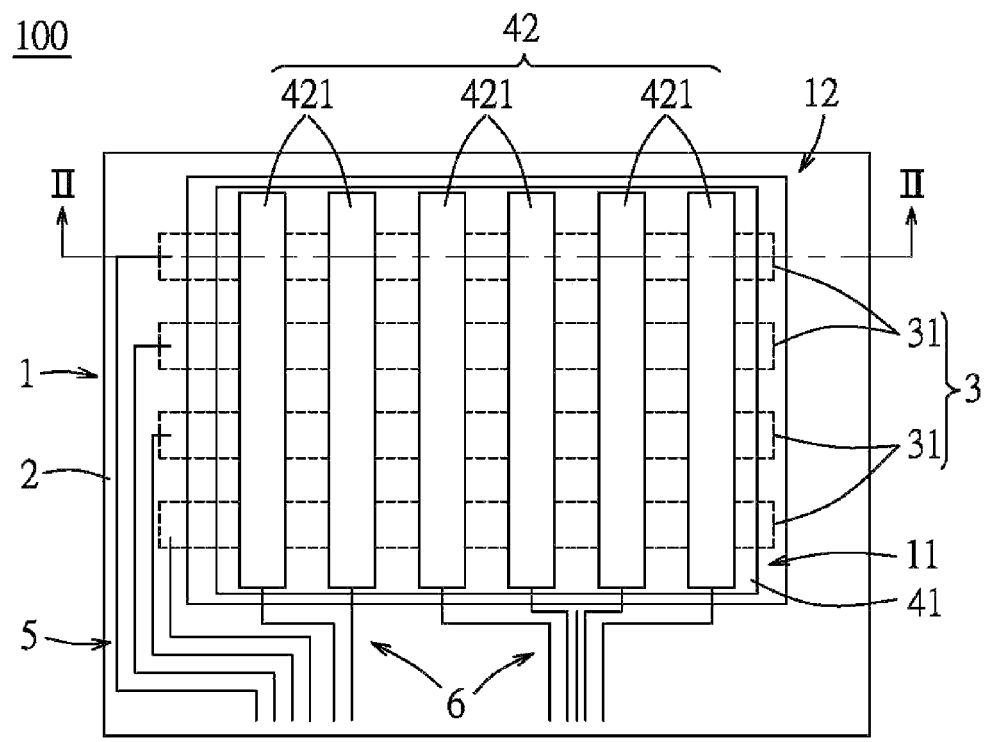
FIG. 1 is a fragmentary side view of a touch-sensitive device in accordance with various embodiments.

Before the disclosure is described in greater detail with reference to the accompanying embodiments, it should be noted herein that like elements are denoted by the same reference numerals throughout the disclosure. Terms such as "upper"/"lower" in this disclosure are used to represent top-bottom relative directions. With respect to the figures accompanying this description, tops and bottoms of the depicted touch-sensitive device respectively appear nearer to and further from the viewer in FIG. 1.

First Touch-Sensitive Device

Figure 2:
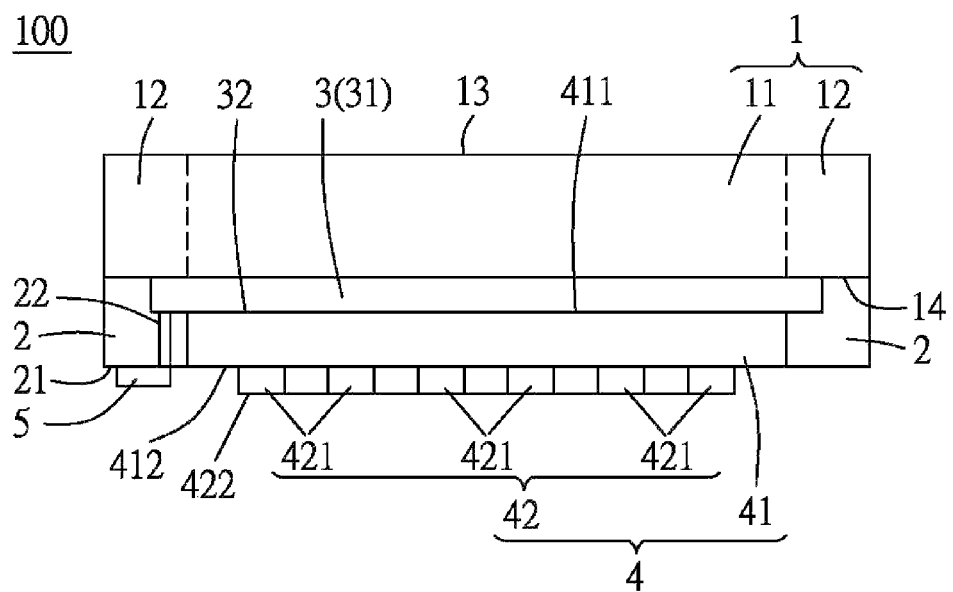
FIG. 2 is a schematic side view taken along line II-II of FIG. 1.

FIGS. 1 and 2 show a touch-sensitive device 100 according to various embodiments of the present disclosure. The touch-sensitive device 100 can be applied to various electronic devices, such as cell phones, tablet computers, notebook computers, etc., and includes a cover plate 1, a light-shading layer 2, a first electrode layer 3, a laminated electrode structure 4, a first electrically-conductive wiring 5 and a second electrically-conductive wiring 6.

The cover plate 1 is made of a light-transmissive material such as glass, is divided into a viewing region 11 and a non-viewing region 12 immediately adjacent to the viewing region 12, and has opposite upper and lower surfaces 13, 14. The viewing region 11 is, herein, a center region of the cover plate 1 and allows a user to view images displayed thereat. The non-viewing region 12 extends around a periphery of the cover plate 1 and serves as a frame at which image is not displayed. It is worth mentioning that, in practice, the cover plate 1 may be made of a material selected from the group consisting of polyethylene terephthalate (PET), polymethylmethacrylate (PMMA) and polycarbonates (PC). The material used to make the cover plate 1 should not be limited by what are disclosed.

The first electrode layer 3 is disposed on the lower surface 14 of the cover plate 1 for generating a first touch sensing signal, corresponds in position to at least the viewing region 11, and includes a plurality of spaced-apart first touch-sensitive electrodes 31. The first touch-sensitive electrodes 31 are made of indium tin oxide (ITO) and formed by film deposition and patterning techniques. As shown in FIG. 1, the first touch-sensitive electrodes 31 extend horizontally and are spaced apart from one another vertically. However, the material and the extending direction of the first electrode layer 3, and the number and shape of the first touch-sensitive electrodes 31 may be changed according to practical requirements and should not be limited to certain implementations.

The light-shading layer 2 is made of opaque ink or photoresist that is capable of resisting light from passing therethrough for preventing a user from noticing the first and second electrically-conductive wirings 5, 6. The light-shading layer 2 is disposed on the lower surface 14 of the cover plate 1 and in the non-viewing region 12, and partially covers the first electrode layer 3. The light-shading layer 2 is formed with a plurality of through-holes 22 that correspond in position to the first electrode layer 3. A plurality of electrically-conductive members (not shown) are formed in the through-holes 22 for electrically connecting the first electrically-conductive wiring 5 to the first electrode layer 3. The electrically-conductive members have a color identical or similar to that of the light-shading layer 2, such that the through-holes 22 are unperceivable by the user.

The laminated electrode structure 4 is one of the main electrode structures of the touch-sensitive device 100, is laminated to the first electrode layer 3, and corresponds in position to at least the viewing region 11. The laminated electrode structure 4 includes an adhesive substrate 41 and a second electrode layer 42. The laminated electrode structure 4 may also partially correspond in position to the non-viewing region 12, that is, the laminated electrode structure 4 may partially cover a lower surface 21 of the light-shading layer 2 oppositely of the cover plate 1 to compensate a height difference between the lower surface 21 of the light-shading layer 2 and the first electrode layer 3 and provide a smooth surface for subsequent processes in making a final product. For instance, the smooth surface facilitates assembling of the touch-sensitive device 100 to a display panel, a liquid crystal display panel.

The adhesive substrate 41 is made of a material including one of a silica gel and an acrylic glue, and is electrically insulating, heat-activated adhesive and light-curable. The adhesive substrate 41 is laminated to a lower surface 32 of the first electrode layer 3 oppositely of the cover plate 1. The adhesive substrate 41 can be a support substrate for the second electrode layer 42 to be disposed and processed thereon. With the heat-activated adhesive property of the adhesive substrate 41, the laminated electrode structure 4 can be laminated to the first electrode layer 3. The adhesive substrate 41 can replace a support substrate and an adhesive layer used in a second electrode layer of a conventional touch-sensitive device, such that the touch-sensitive device 100 can be made thinner and more light-weight. The adhesive substrate 41 is adhesive after being heated to a temperature ranging from 100° C. to 140° C. This temperature range is lower than a temperature (200° C.) for a conventional ITO sputtering technique. Therefore, during the manufacturing process, damage to electrical conductivity of the second electrode layer 42 can be prevented. However, based on practical requirements, the adhesive substrate 41 can be made of other materials or composition of the adhesive substrate 41 can be changed for changing properties of the adhesive substrate 41, and should not be limited by this disclosure. Moreover, based on different dimensions of the touch-sensitive device 100 or different thicknesses of the light-shading layer 2, thickness of the adhesive substrate 41 can be adjusted to compensate for different height differences between the lower surface 21 of the light-shading layer 2 and the first electrode layer 3. For example, the light-shading layer 2 has a thickness ranging from 3 mm to 7 mm and the adhesive substrate 41 accordingly has a thickness ranging from 3 mm to 10 mm. When the thickness of the adhesive substrate 41 is smaller than 3 mm, the thickness of the adhesive substrate 41 is smaller than that of the light-shading layer 2, which makes the adhesive substrate 41 incapable of effectively compensating for the height difference between the lower surface 21 of the light-shading layer 2 and the first electrode layer 3 and the adhesive substrate 41 cannot be effectively laminated to the lower surface 32 of the first electrode layer 3. The hardness of the adhesive substrate 41 increases with thickness thereof. When the thickness of the adhesive substrate 41 is larger than 10 mm, due to its hardness, the adhesive substrate 41 cannot fully adhere to the lower surface 32 of the first electrode layer 3 and leaves a gap therewith that can affect process yield of laminating the adhesive substrate 41 to the first electrode layer 3. Moreover, reflectivity of the gap is different from that of the adhesive substrate 41. The reflectivity difference can affect aesthetic appearance of the touch-sensitive device 100. In the range of thickness of the adhesive substrate 41, thicker adhesive substrate 41 provides stronger adhesive strength and therefore is suitable for the touch-sensitive device 100 with a larger dimension.

The second electrode layer 42 is made of an electrically-conductive material, is disposed on a lower surface 412 of the adhesive substrate 41 oppositely of the first electrode layer 3, and includes a plurality of second touch-sensitive electrodes 421. As shown in FIG. 1, the second touch-sensitive electrodes 421 extend vertically, are spaced apart from each other horizontally, and are orthogonal to the first touch-sensitive electrodes 31. A capacitance array is formed in the touch-sensitive device 100 by the cross arrangement and partial overlapping among the first touch-sensitive electrodes 31 and the second touch-sensitive electrodes 421. When an object, such as a finger, touches the touch-sensitive device 100, the touch action can be sensed and positioned according to capacitance change. However, the material and extending direction of the second electrode layer 42, and number and shape of the second touch-sensitive electrodes 421 may be changed according to practical requirements and should not be limited to certain implementations.

In the first embodiment, the second electrode layer 42 is made of an electrically-conductive liquid material including one of an electrically-conductive polymeric material and a nano-metallic material. Therefore, the second electrode layer 42 can be attached to the lower surface 412 of the adhesive substrate 41 by printing or coating. The electrically-conductive polymeric material may be poly(3,4-ethylenedioxythiophene) polystyrene sulfonate (PEDOT:PSS). The nano-metallic material may be nano-silver, nano-copper, etc. It is worth mentioning that, in the first embodiment, the first electrode layer 3 is made of indium tin oxide, but can also be made of a transparent electrically-conductive material other than indium tin oxide, such as the same electrically-conductive material of the second electrode layer 42. The second electrode layer 42 may be made of a liquid material that is anaerobic photosensitive, such that the second electrode layer 42 can be patterned without using photoresist coating and etching processes and the overall fabrication process is simplified. This process will be described hereinafter.

The first electrically-conductive wiring 5 is substantially disposed on the lower surface 21 of the light-shading layer 2, and is electrically connected to the first electrode layer 3 through the electrically-conductive members respectively disposed in the through-holes 22 for transmitting signals from the first electrode layer 3. The first electrically-conductive wiring 5 may be an electrically-conductive material such as metal, and includes a plurality of wires that are correspondingly connected to the electrically-conductive members respectively disposed in the through-holes 22. However, the layout of the first electrically-conductive wiring 5 may be adjusted according to actual requirements and is not be limited to certain implementations.

The second electrically-conductive wiring 6 is also substantially disposed on the lower surface 21 of the light-shading layer 2, is electrically connected to the second electrode layer 42 for transmitting signals from the second electrode layer 42, and is electrically insulated from the first electrode layer 3 and the first electrically-conductive wiring 5. The material and layout of the second electrically-conductive wiring 6 are similar to those of the first electrically-conductive wiring 5 in that they may be designed according to practical requirements and are not be limited to certain implementations. The touch-sensitive device 100 further includes a protective layer (not shown) that is electrically-insulating and that covers at least the second electrode layer 42. Preferably, the protective layer covers the second electrode layer 42, the first electrically-conductive wiring 5, the second electrically-conductive wiring 6 for protecting the second electrode layer 42, the first electrically-conductive wiring 5, the second electrically-conductive wiring 6.

Compared to the conventional touch-sensitive device including a thicker glass substrate, the touch-sensitive device 100 of this disclosure utilizes the laminated electrode structure 4 including the adhesive substrate 41 to achieve a thinner and more light-weight structure.

Moreover, besides being the support substrate for the second electrode layer 42 to be disposed and processed thereon, the adhesive substrate 41 has the heat-activated adhesive property that enables omission of an extra adhesive (e.g., liquid optical clear adhesive, LOCA). Therefore, the laminated electrode structure 4 can be directly laminated to the first electrode layer 3. Yield loss caused by the adhesive can be alleviated, fabrication process can be simplified, yield can be improved, and the touch-sensitive device 100 can be thinner and more light-weight. Furthermore, when the adhesive substrate 41 of the laminated electrode structure 4 is used in manufacturing a large-sized touch-sensitive device 100, the problems associated with the thickness of the adhesive being too thin and uneven can be solved. Manufacturing process of the large-sized touch-sensitive device 100 is facilitated and process yield is increased.

Furthermore, the second electrode layer 42 of the laminated electrode structure 4 is made of the electrically-conductive liquid material including one of the electrically-conductive polymeric material and the nano-metallic material. Conventional indium tin oxide is known to be brittle and electric conductivity thereof tends to decrease under elevated process temperature. By using the electrically-conductive liquid material to replace indium tin oxide, electrical reliability of the touch-sensitive device 100 can be improved. The second electrode layer 42 may be selected from the liquid electrically-conductive material having photocurable property and be patterned by exposure and development without using conventional resist coating and etching techniques. Therefore, the process cost is decreased, the process is simplified, and the process yield is increased.

Referring to FIGS. 3 to 8, a method of manufacturing the touch-sensitive device 100 is described hereafter.

Figure 3:
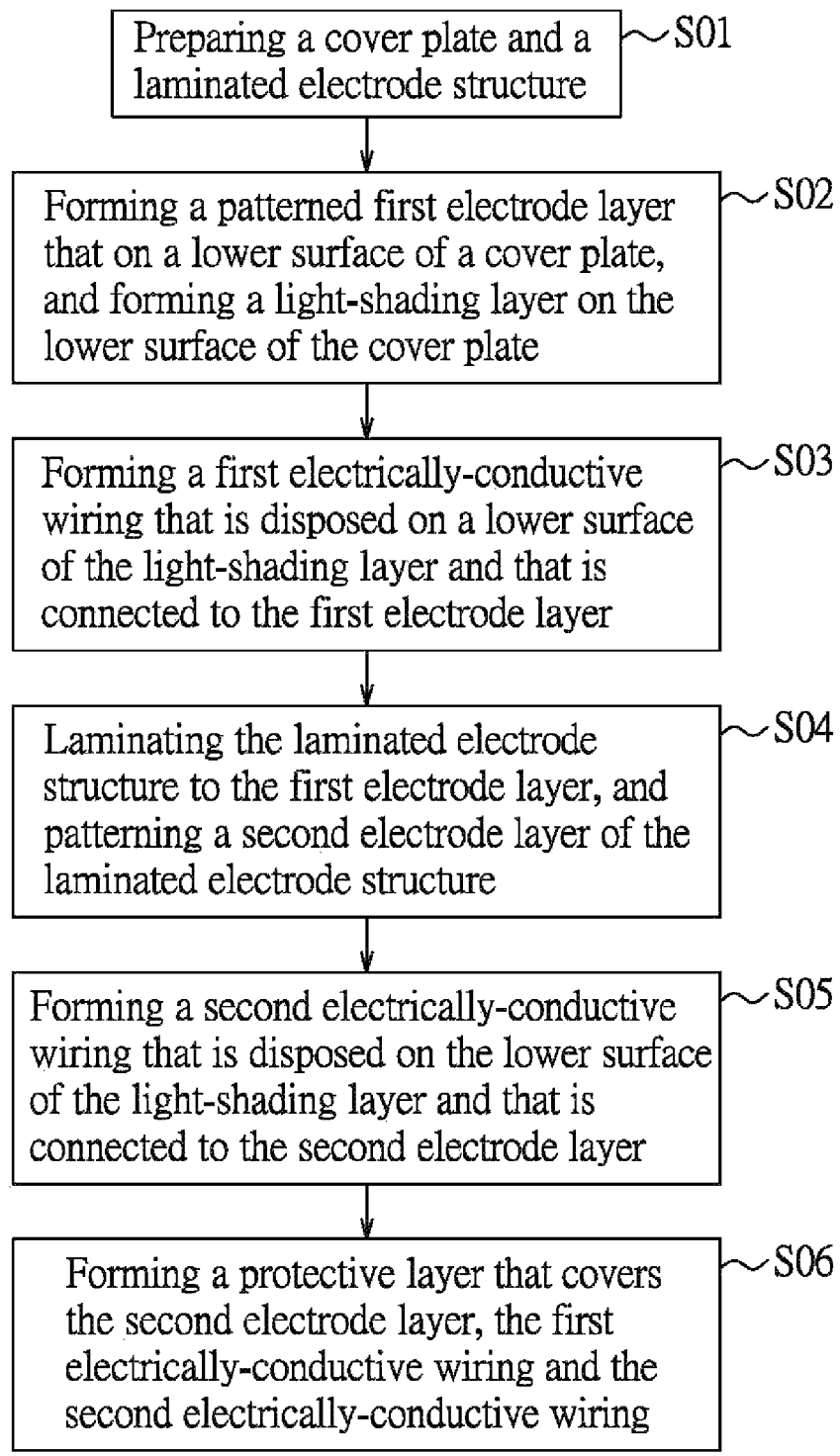
FIG. 3 is a flow chart of a method of manufacturing a touch-sensitive device in accordance with various embodiments.
Figure 4:
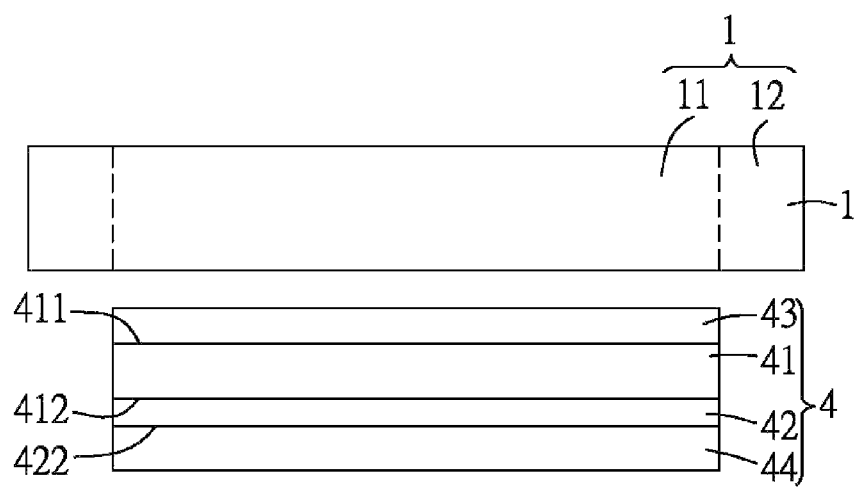
FIGS. 4 to 8 illustrate consecutive steps of the method of manufacturing the touch-sensitive device.

Referring to FIGS. 1, 3 and 4, step S01 is a preparation step that requires preparation of the cover plate 1 and the laminated electrode structure 4.

In another example, the laminated electrode structure 4 further includes a first release layer 43 that is detachably disposed on the upper surface 411 of the adhesive substrate 41, and a second release layer 44 that is detachably disposed on the lower surface 422 of the second electrode layer 42. The second electrode layer 42 of the laminated electrode structure 4 is formed by covering an electrically-conductive liquid material including one of an electrically-conductive polymeric material and a nano-metallic material on the lower surface 412 of the adhesive substrate 41 using printing or coating, followed by solidification process. In this step, the second electrode layer 42 remains in a complete film-shape or layer-shape without being patterned.

Figure 5:
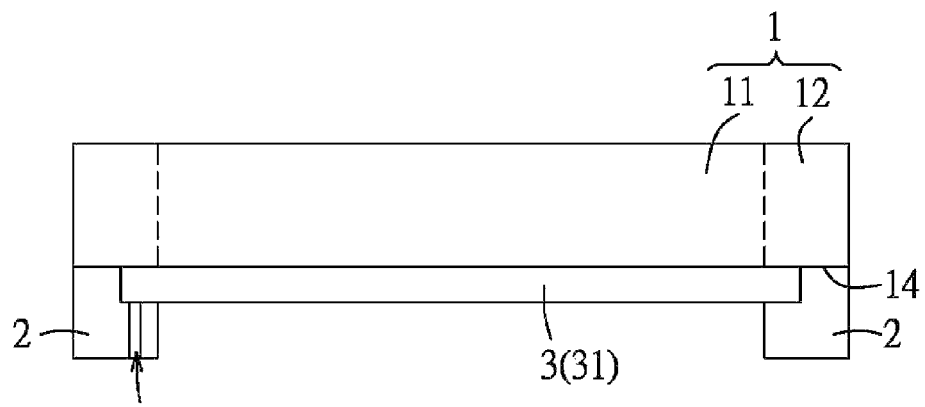

Referring to FIGS. 1, 3 and 5, step S02 aims at manufacturing the first electrode layer 3 and the light-shading layer 2. Firstly, a light-transmissive electrode layer such as indium tin oxide as described above is formed on the lower surface 14 of the cover plate 1 corresponding in position to at least the viewing region 11, followed by patterning using etching process to form a plurality of the first touch-sensitive electrodes 31 of the first electrode layer 3. Then, the light-shading layer 2 is formed by covering the opaque ink or photoresist on the lower surface 14 of the cover plate 1 corresponding in position to the non-viewing region 12. The light-shading layer 2 partially covers the first electrode layer 3 and has a thickness ranging from 3 mm to 7 mm. Finally, the light-shading layer 2 is formed with a plurality of the through-holes 22 that correspond in position to the first touch-sensitive electrodes 31. A plurality of the electrically-conductive members (not shown) are formed in the through-holes 22. The step of manufacturing the first electrode layer 3 and the light-shading layer 2 is thus completed.

Figure 6:
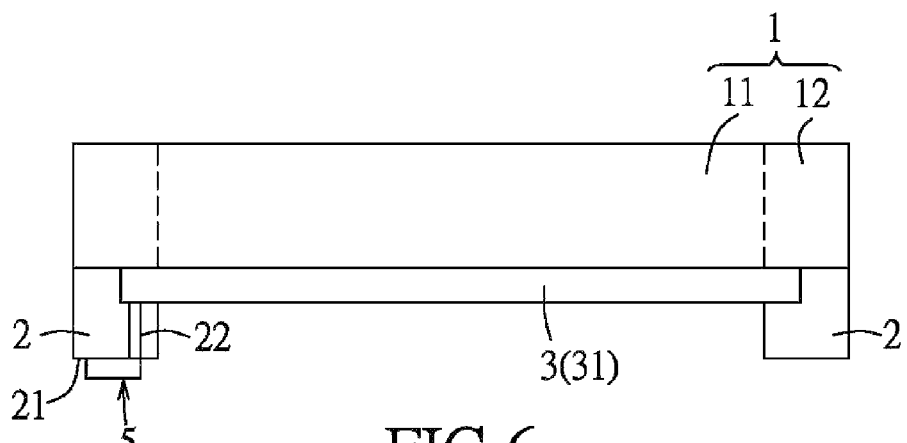

Referring to FIGS. 1, 3 and 6, step S03 aims at manufacturing the first electrically-conductive wiring 5 on the lower surface 21 of the light-shading layer 2. The first electrically-conductive wiring 5 is electrically connected to the first electrode layer 3 via the electrically-conductive members (not shown) in the through-holes 22. In this embodiment, the entire first electrically-conductive wiring 5 can be made of a metal material such as silver, copper, molybdenum, aluminum, etc., and can be form by printing technique, but should not be limited by this embodiment. The electrically-conductive members (not shown) have a color identical or similar to that of the light-shading layer 2, such that the through-holes 22 are non-perceivable by the user.

Referring to FIGS. 1, 3, 7 and 8, step S04 aims at laminating the laminated electrode structure 4 to the first electrode layer 3 and processing the second electrode layer 42 into the second touch-sensitive electrodes 421. Detailed processes of the step S04 will be described hereinafter with reference to the accompanying drawings.

Referring to FIGS. 1 to 3, steps S05 and S06 will now be described. After processing the second electrode layer 42 in step S04, step S05 pertains to a step of further forming the second electrically-conductive wiring 6 on the lower surface 21 of the light-shading layer 2, and making the second electrically-conductive wiring 6 electrically insulated from the first electrode layer 3 and the first electrically-conductive wiring 5. The material and manufacturing method of the second electrically-conductive wiring 6 may be similar to those of the first electrically-conductive wiring 5. The layout of the second electrically-conductive wiring 6 is not limited to what is disclosed in this embodiment. In step S06, after finishing processing the light-shading layer 2, the first electrode layer 3, the laminated electrode structure 4, the first electrically-conductive wiring 5 and the second electrically-conductive wiring 6, covering the protective layer on the light-shading layer 2, the second electrode layer 42, the first electrically-conductive wiring 5 and the second electrically-conductive wiring 6 for achieving the purpose of protection.

Therefore, based on the abovementioned steps S01 to S06, the touch-sensitive device 100 of this embodiment can be obtained. It should be noted that, although the first electrically-conductive wiring 5 is first made followed by making the second electrically-conductive wiring 6, the second electrically-conductive wiring 6 may be made first followed by making the first electrically-conductive wiring 5. Manufacturing orders should not be limited by this embodiment. It is worth noticing that, when the first electrically-conductive wiring 5 and the second electrically-conductive wiring 6 are made of the same material, the first electrically-conductive wiring 5 and the second electrically-conductive wiring 6 may be made in the same step for process simplification and efficiency enhancement.

Referring to FIGS. 9 to 13, a detailed process of making the laminated electrode structure 4 in step S04 will be described hereafter.

Figure 7:
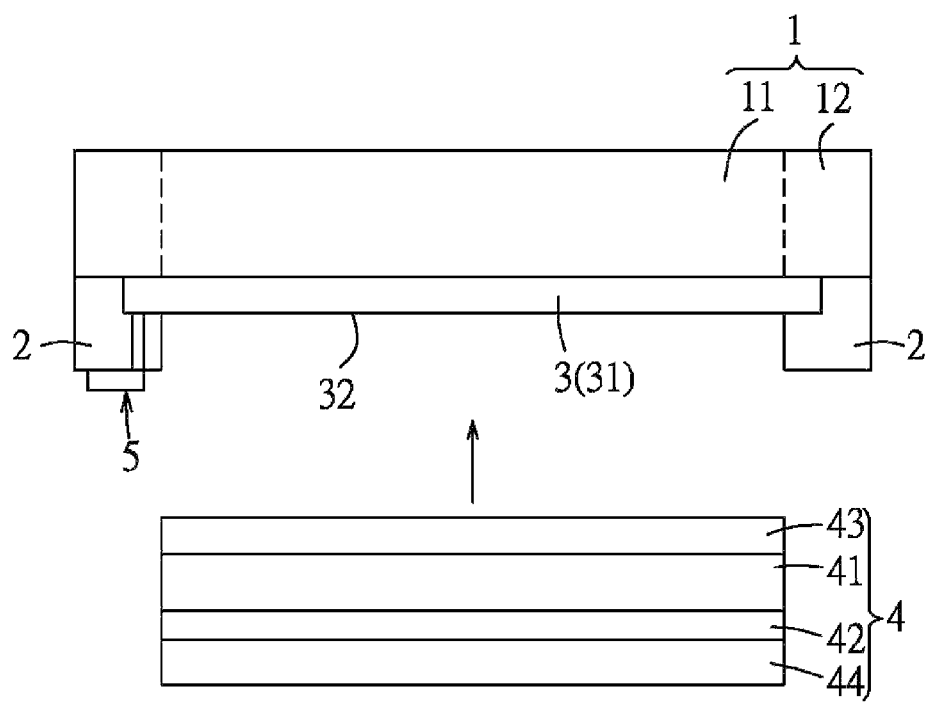
Figure 8:
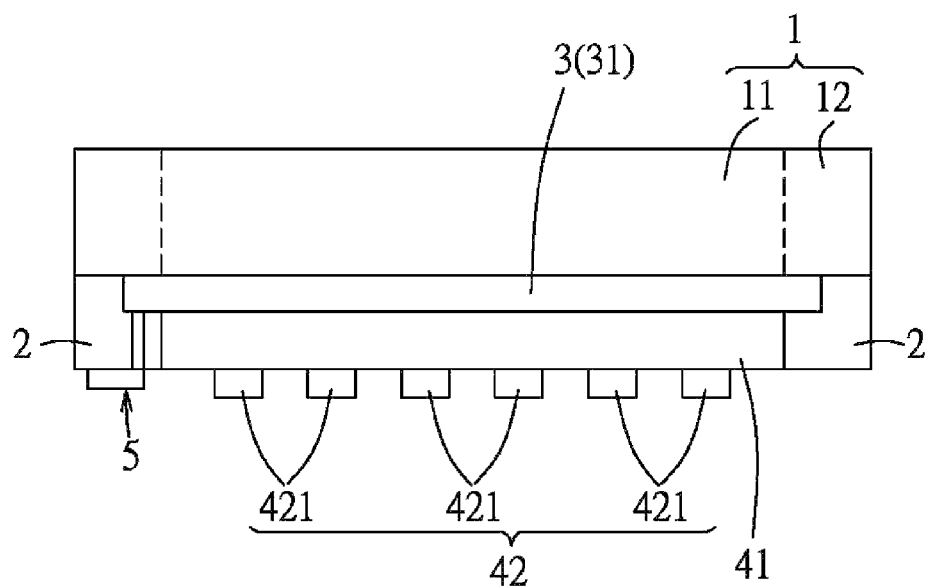
Figure 9:
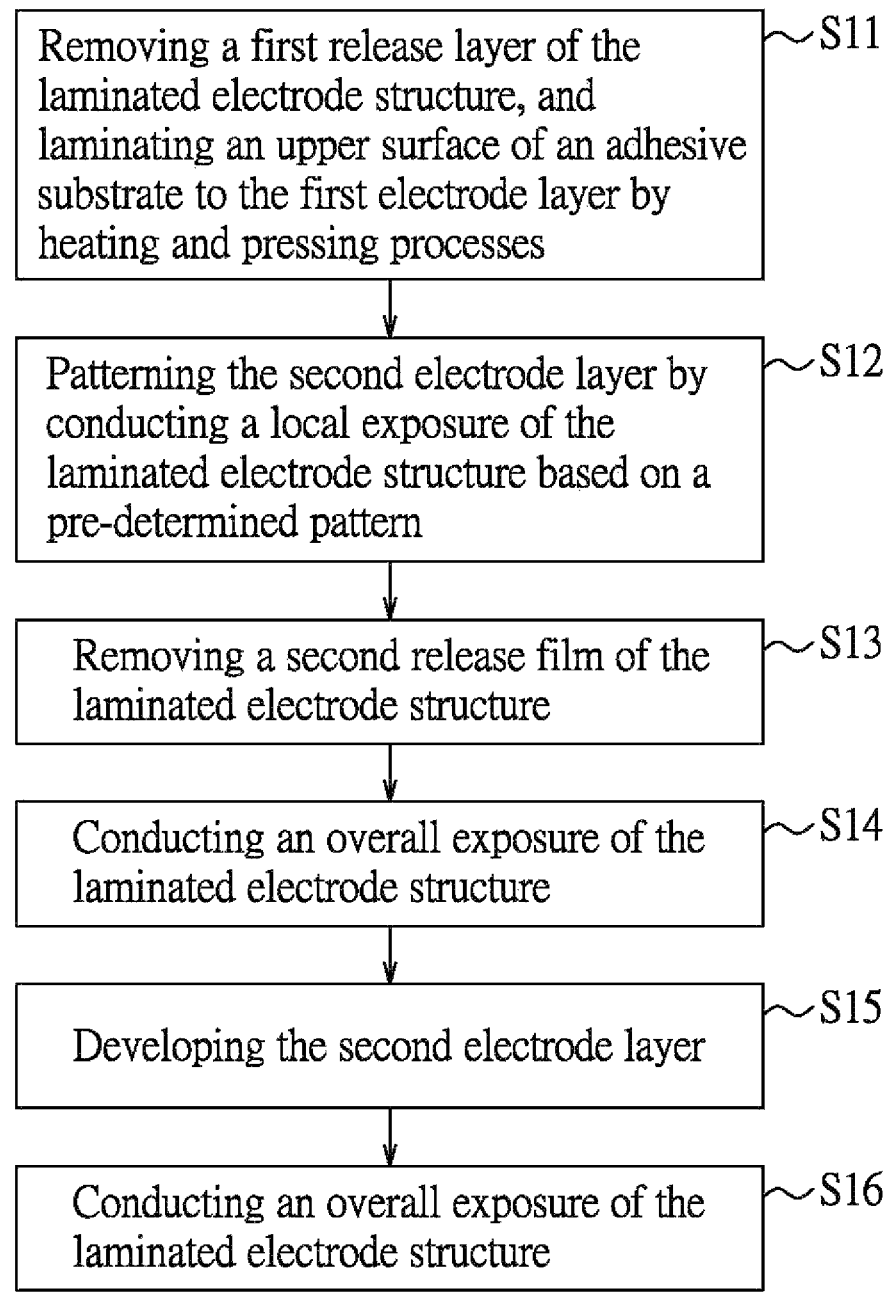
FIG. 9 is a flow chart showing a method of manufacturing a laminated electrode structure of the touch-sensitive device.
Figure 10:
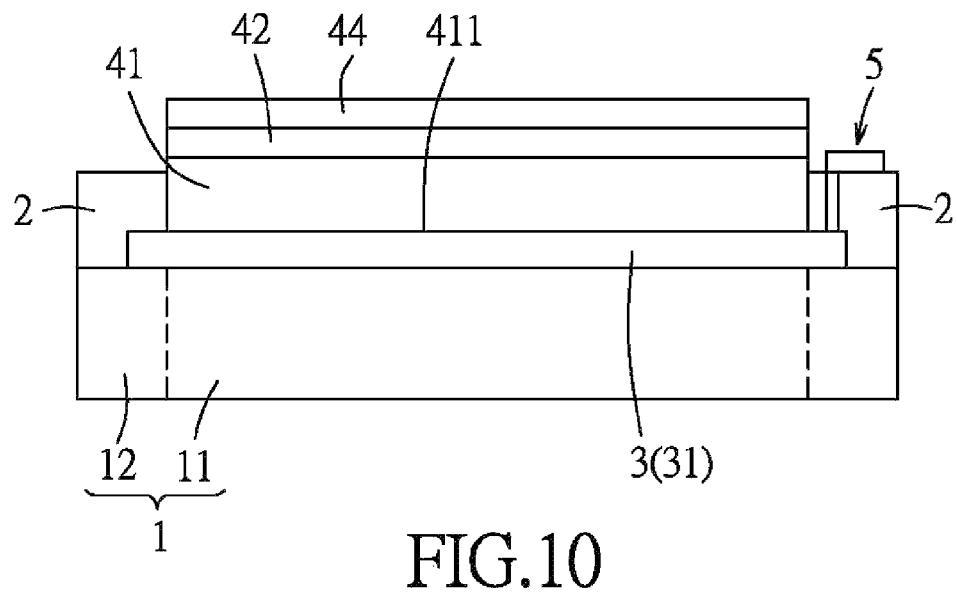
FIGS. 10 to 13 illustrate consecutive steps of the method of the laminated electrode structure.

Referring to FIGS. 7, 9 and 10, in step S11, the first release layer 43 is removed from the upper surface 411 of the adhesive substrate 41 followed by laminating the adhesive substrate 41 to the first electrode layer 3 by heating and pressing processes. In this embodiment, the pressing process is conducted at a pressure of 3.5 MPa and the heating process is conducted at a temperature of 110° C. so that the adhesive substrate 41 made of silica gel or acrylic glue becomes molten and adhesive that is capable of attaching onto the first electrode layer 3, followed by cooling to a certain temperature. However, in this step, the heating process may be conducted at a temperature ranging from 100° C. to 140° C., and the pressing process may be conducted at a pressure ranging from 2.5 MPa to 5.0 MPa. In these ranges, the step S11 can be well carried out and a good process yield can be obtained.

Figure 11:
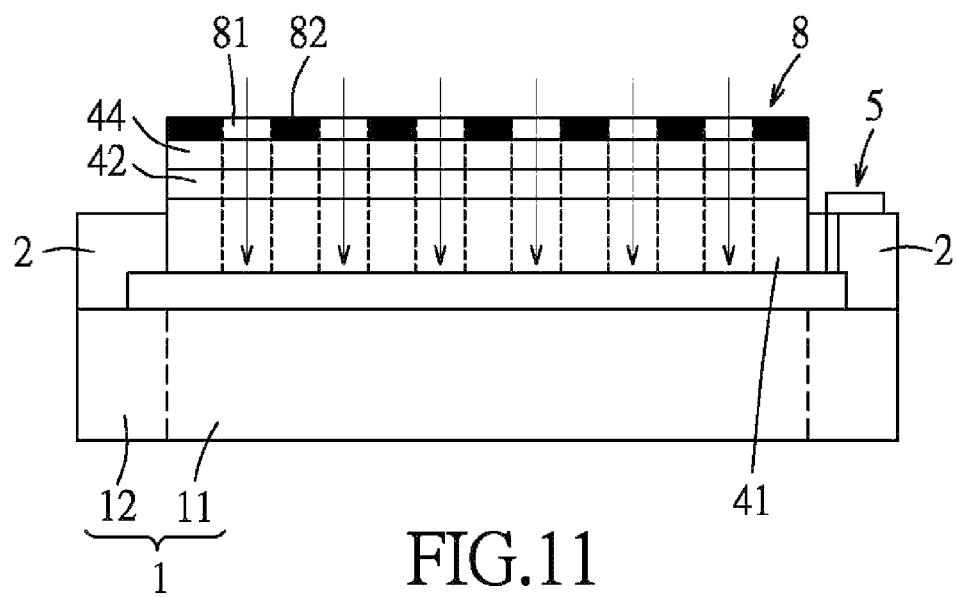

Referring to FIGS. 1, 9 and 11, step S12 pertains to a process of conducting a local exposure of the laminated electrode structure 4 based on a predetermined pattern, such that the second electrode layer 42 is formed with a solidified pattern.

Specifically, the solidified pattern of the second electrode layer 42 is defined by a photomask 8. The photomask 8 includes a plurality of light-transmissive regions 81 and a plurality of opaque regions 82 (shown in FIG. 11 in black).

The adhesive substrate 41 and the second electrode layer 42 both have anaerobic photosensitivity, that is, the adhesive substrate 41 and the second electrode layer 42 will be solidified when radiated by ultraviolet light in an anoxic environment. Two surfaces of the adhesive substrate 41 are respectively covered by the second electrode layer 42 and the first electrode layer 3. Two surfaces of the second electrode layer 42 are respectively covered by the adhesive substrate 41 and the second release layer 44. Most parts of the adhesive substrate 41 and the second electrode layer 42 are not exposed to the oxygen in the air. Therefore, by radiating an ultraviolet light (e.g., an ultraviolet light having a wavelength of 365 nm) through the light-transmissive regions 81 of the photomask 8 onto the adhesive substrate 41 and the second electrode layer 42, the regions of the adhesive substrate 41 and the second electrode layer 42 corresponding to the light-transmissive regions 81 will be solidified and the regions of the adhesive substrate 41 and the second electrode layer 42 corresponding to the opaque region 82 remain unsolidified. Therefore, the second electrode layer 42 is solidified and defined into the second touch-sensitive electrodes 421.

Figure 12:
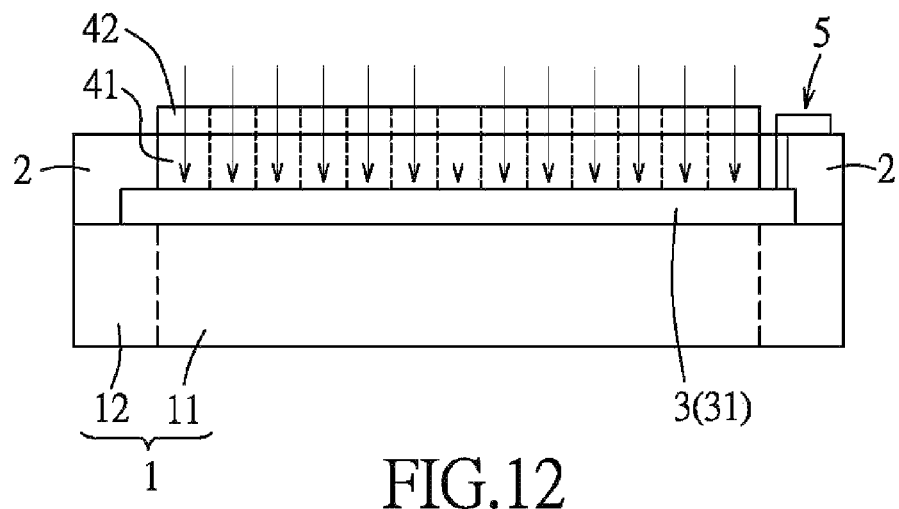
Figure 13:
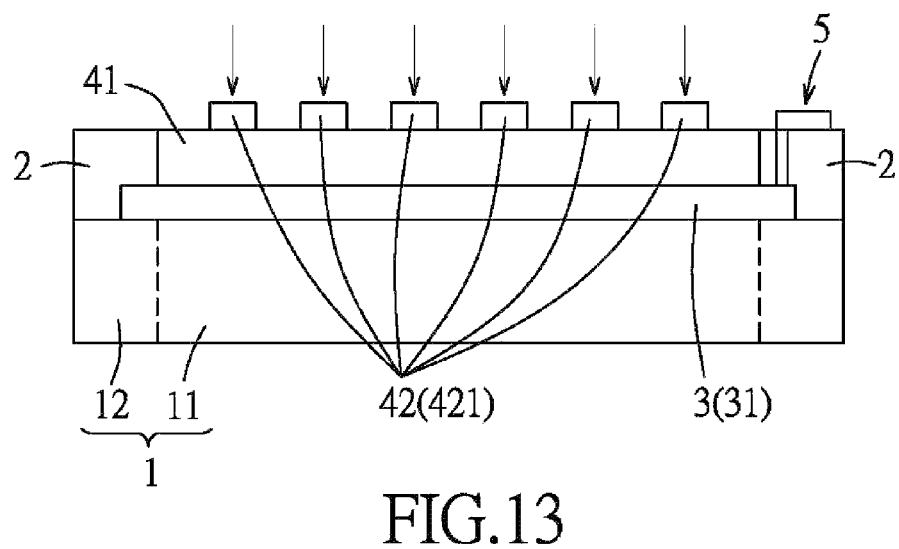

Referring to FIGS. 9 and 12, steps S13 and S14 aim at conducting an overall exposure of the laminated electrode structure 4.

In step S13, the second release film 44 is first removed from the second electrode layer 42, so that the second electrode layer 42 is exposed to air. Then, in step S14, an overall exposure of the laminated electrode structure 4 is conducted, so that the overall adhesive substrate 41 is solidified by the radiation. In this step, although the whole second electrode layer 42 is exposed to the radiation, the second electrode layer 42 maintains its solidified status (i.e., partial solidification) as of the completion of step S12. This is due to the anaerobic photosensitivity of the second electrode layer 42, this is, the second electrode layer 42 will not be solidified by the radiation in an oxygen-containing environment. Therefore, after step S14, the overall adhesive substrate 41 is solidified and the second electrode layer 42 maintains the solidified status as in step S12.

Steps S15 and S16 aim at finishing patterning the second electrode layer 42. In step S15, the second electrode layer 42 is developed to form the second touch-sensitive electrodes 421 by using a chemical such as a developer to remove unsolidified parts of the second electrode layer 42 (that is, the parts corresponding to the opaque regions 82 of the photomask 8 as shown in FIG. 11). The adhesive substrate 41 is entirely solidified in step S13, and therefore, is not developed in this step. Finally, in step S16, an overall exposure of the laminated electrode structure 4 is conducted to finish a final solidification of the laminated electrode structure 4.

According to steps S11 to S16, this embodiment utilizes the anaerobic photosensitivity of the adhesive substrate 41 and the second electrode layer 42 to simply patterning of the second electrode layer 42 using exposure and development processes. Extra etching process is not required to process the second electrode layer 42. Therefore, the overall process is simplified and the process yield is improved. However, base on practical requirements, patterning process of the second electrode layer 42 can be conducted in different manners and is not limited to what is disclosed herein.

Second Touch-Sensitive Device

Figure 14:
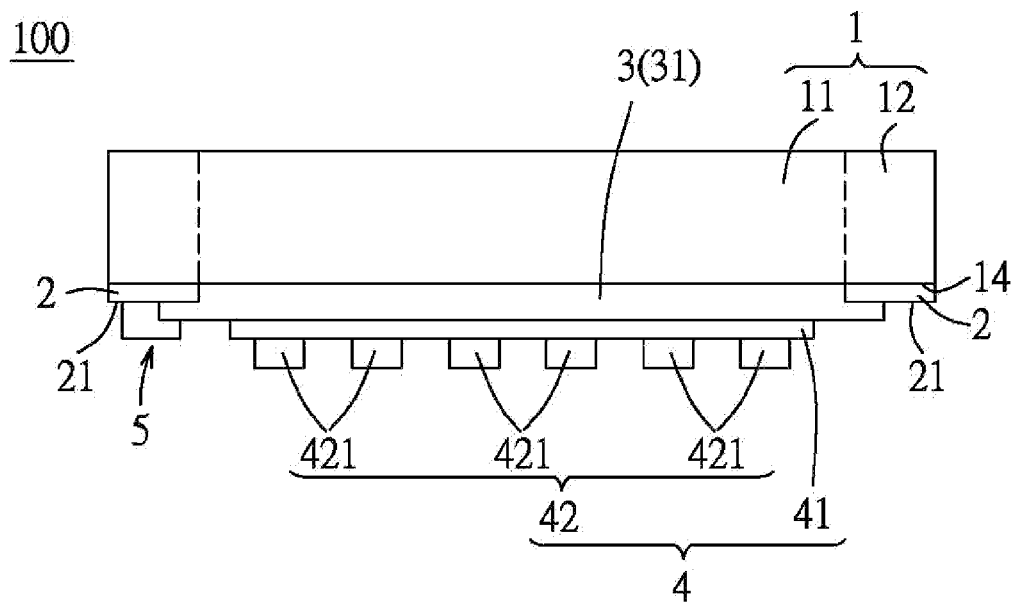
FIG. 14 is a schematic side view of a touch-sensitive device in accordance with various embodiments.

FIG. 14 shows a second embodiment of the touch-sensitive device 100 according to the present disclosure. The second embodiment has a structure similar to that of the first embodiment with the differences residing in that, in the second embodiment, part of the light-shading layer 2 is covered by the first electrode layer 3, where in the first embodiment, the light-shading layer 2 covers the first electrode layer 3 and therefore, the first electrically-conductive wiring 5 can be directly connected to the first electrode layer 3 on the lower surface 21 of the light-shading layer 2 without forming the through-holes 22 and that the second electrically-conductive wiring 6 is also disposed on the lower surface 21 of the light-shading layer 2, is electrically connected to the second electrode layer 42, and is electrically insulated from the first electrode layer 3 and the first electrically-conductive wiring 5 for being able to transmit a signal generated by the second electrode layer 42.

Based on the abovementioned differences, a method of manufacturing the touch-sensitive device 100 in this embodiment is slightly different from that of the first embodiment. Referring to FIGS. 3 and 14, step S01 is conducted first. Then, in step S02, the light-shading layer 2 is formed on part of the lower surface 14 of the cover plate 1 corresponding in position to the non-viewing region 12, followed by forming the first electrode layer 3 to cover part of the light-shading layer 2. Next, in step S03, the first electrically-conductive wiring 5 is formed on the lower surface 21 of the light-shading layer 2 and is electrically connected to the first electrode layer 3. Finally, in steps S04 to S06, this embodiment has processes similar to those of the first embodiment. Therefore, the processes are not described for the sake of brevity.

Third Touch-Sensitive Device

Figure 15:
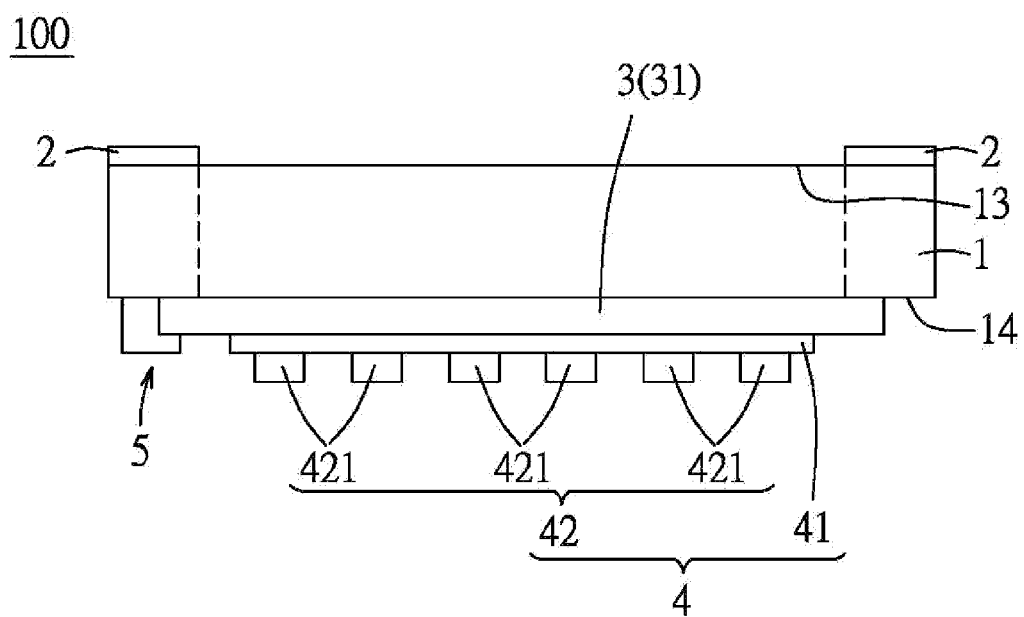
FIG. 15 is a schematic side view of a touch-sensitive device in accordance with various embodiments.

FIG. 15 shows a third embodiment of the touch-sensitive device 100 according to the present disclosure. The third embodiment has a structure similar to those of the first and second embodiments with the differences residing in that, in the third embodiment, the light-shading layer 2 is, disposed on the upper surface 13 of the cover plate 1, and the first and second electrically-conductive wirings 5, 6 are directly disposed on the lower surface 14 of the cover plate 1. Therefore, the light-shading layer 2 does not cover the first electrode layer 3 in this embodiment.

Referring to FIGS. 3 and 15, based on the abovementioned differences, a method of manufacturing the touch-sensitive device 100 in this embodiment also includes a step of conducting step S01 first. Then, in step S02, the light-shading layer 2 and the first electrode layer 3 are respectively disposed on the upper and lower surfaces 13, 14 of the cover plate 1. In step S03, the first electrode layer 3 is formed on the lower surface 14 of the cover plate 1. Finally, in steps S04 to S06, this embodiment has processes similar to those of the first and second embodiments. Therefore, the processes are not described for the sake of brevity.

Based on the first to third embodiments, with the implementation of the laminated electrode structure 4, the touch-sensitive device 100 of the present disclosure can have reduced volume and thickness, simplified process steps, and improved process yield since high temperature and etching processes are not required. Besides, the laminated electrode structure 4 including the adhesive substrate 41 can be used in large-sized touch-sensitive device 100 without suffering from the drawbacks of the conventional optical clear adhesive. Therefore, the touch-sensitive device 100 and the manufacturing method thereof can achieve the purposes of the present disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A touch-sensitive device, comprising:
   a cover plate having an upper surface and a lower surface opposite said upper surface of said cover plate;
   a first electrode layer disposed on said lower surface of said cover plate for generating a first touch sensing signal;
   a light-shading layer disposed on said lower surface of said cover plate and disposed on a lower surface of said first electrode layer, wherein:
     said light-shading layer defines a plurality of through-holes underlying said first electrode layer,
     a plurality of electrically-conductive members are disposed in said plurality of through-holes and surrounded by said light-shading layer;
   a laminated electrode structure comprising:
     an adhesive substrate that is an electrically insulating and heat-activated adhesive; and
     a second electrode layer disposed on a first surface of said adhesive substrate, wherein:
       a second surface of said adhesive substrate that is opposite to said first surface is laminated to said first electrode layer, and
       a lower surface of said light-shading layer and said second surface of said adhesive substrate are coplanar; and
   first electrically-conductive wiring and second electrically-conductive wiring that are disposed on a surface of said light-shading layer opposite to an interface between said light-shading layer and said first electrode layer, wherein:
     said first electrically-conductive wiring is electrically connected to said first electrode layer via said plurality of electrically-conductive members, and
     said second electrically-conductive wiring being electrically connected to said second electrode layer.

2. The touch-sensitive device as claimed in claim 1, wherein said second electrode layer is made of an electrically-conductive liquid material comprising one of an electrically-conductive polymeric material or a nano-metallic material.

3. The touch-sensitive device as claimed in claim 2, wherein said second electrode layer has anaerobic photosensitivity.

4. The touch-sensitive device as claimed in claim 1, wherein:
   an upper surface of said first electrode layer contacts said lower surface of said cover plate,
   an upper surface of said light-shading layer contacts said lower surface of said cover plate, and
   said adhesive substrate contacts a sidewall of said light-shading layer.

5. The touch-sensitive device as claimed in claim 1, wherein said first electrode layer and said second electrode layer comprise different materials.

6. The touch-sensitive device as claimed in claim 1, wherein:
   said second electrically-conductive wiring is electrically insulated from said first electrode layer and said first electrically-conductive wiring.

7. The touch-sensitive device as claimed in claim 1, further comprising a protective layer that is electrically-insulating and that covers at least said second electrode layer.

8. The touch-sensitive device as claimed in claim 1, wherein:
   said adhesive substrate is made of a material comprising one of a silica gel or an acrylic glue, and
   said adhesive substrate is adhesive after being heated to a temperature ranging from 100° C. to 140° C.

* * * * *